US011967901B2

(12) United States Patent
Petersen

(10) Patent No.: US 11,967,901 B2
(45) Date of Patent: Apr. 23, 2024

(54) HYBRID MULTI-PHASE POWER CONVERTER WITH PHASE SHEDDING

(71) Applicant: Dialog Semiconductor (UK) Limited, London (GB)

(72) Inventor: Holger Petersen, Pastetten (DE)

(73) Assignee: Renesas Design (UK) Limited, Bourne End (GB)

( * ) Notice: Subject to any disclaimer, the term of this patent is extended or adjusted under 35 U.S.C. 154(b) by 189 days.

(21) Appl. No.: 17/546,320

(22) Filed: Dec. 9, 2021

(65) Prior Publication Data
US 2023/0188034 A1 Jun. 15, 2023

(51) Int. Cl.
*H02M 3/07* (2006.01)
*H02M 1/00* (2006.01)
*H02M 3/158* (2006.01)

(52) U.S. Cl.
CPC ......... *H02M 3/158* (2013.01); *H02M 1/0095* (2021.05); *H02M 3/07* (2013.01)

(58) Field of Classification Search
CPC ...................... H02M 3/07–078; H02M 1/0095
See application file for complete search history.

(56) References Cited

U.S. PATENT DOCUMENTS

| | | | |
|---|---|---|---|
| 6,963,497 B1 | 11/2005 | Herbert | |
| 7,230,405 B2 | 6/2007 | Jang et al. | |
| 7,782,027 B2 | 8/2010 | Williams | |
| 8,427,113 B2 | 4/2013 | Xing et al. | |
| 9,559,589 B2 | 1/2017 | Petersen | |
| 9,768,682 B2 | 9/2017 | Banag | |
| 9,948,177 B2 | 4/2018 | Alarcon-Cot | |
| 10,003,261 B2 | 6/2018 | Petersen | |
| 10,075,080 B1 | 9/2018 | Scoones | |
| 10,218,255 B1 | 2/2019 | Petersen | |

(Continued)

FOREIGN PATENT DOCUMENTS

CN 110165892 A * 8/2019
DE 102015209330 A1 11/2016

(Continued)

OTHER PUBLICATIONS

Machine translation of CN 110165892A by Lian. (Year: 2019).*

(Continued)

*Primary Examiner* — Peter M Novak
(74) *Attorney, Agent, or Firm* — Saile Ackerman LLC; Stephen B. Ackerman

(57) ABSTRACT

A power converter which has a reservoir capacitor, a first flying capacitor, and first and second inductors coupled to a network of switches is presented. A driver is adapted to drive the network of switches with a sequence of states during a drive period. The power converter is operable in a first mode to deliver an output current using both the first and second inductors and a second mode to deliver the output current using the first inductor and without using the second inductor. When a load current is above a threshold value, the driver drives the network of switches in a first sequence of states to operate the power converter in the first mode. When the load current is equal or below the threshold value, the driver drives the network of switches in a second sequence of states to operate the power converter in the second mode.

14 Claims, 14 Drawing Sheets

(56) References Cited

U.S. PATENT DOCUMENTS

| | | |
|---|---|---|
| 10,230,302 B2 | 3/2019 | Petersen |
| 10,256,729 B1 | 4/2019 | Notsch |
| 10,291,117 B2 | 5/2019 | Petersen |
| 10,530,256 B1 | 1/2020 | Jayaraman |
| 10,547,241 B1 | 1/2020 | Li |
| 10,615,697 B1 | 4/2020 | Ferrari |
| 10,622,890 B1 | 4/2020 | Lidsky |
| 10,637,352 B2 | 4/2020 | Illiano |
| 10,727,747 B2 | 7/2020 | Macri |
| 10,756,623 B1 | 8/2020 | Petersen |
| 10,790,742 B1 | 9/2020 | Petersen |
| 10,804,798 B1 | 10/2020 | Rizzolatti |
| 10,811,974 B1 | 10/2020 | Petersen |
| 10,826,395 B2 | 11/2020 | Song |
| 10,879,801 B2 | 12/2020 | Zhang |
| 11,005,371 B2 | 5/2021 | Cannillo |
| 11,011,988 B1 | 5/2021 | Jeffremow |
| 11,011,991 B1 | 5/2021 | Mercer |
| 11,228,243 B2 | 1/2022 | Petersen |
| 11,496,051 B2 * | 11/2022 | Petersen ............... H02M 3/155 |
| 2001/0022735 A1 | 9/2001 | Zanuccoli |
| 2008/0079393 A1 | 4/2008 | Spartano et al. |
| 2008/0157732 A1 | 7/2008 | Williams |
| 2008/0158915 A1 | 7/2008 | Williams |
| 2009/0033289 A1 | 2/2009 | Xing et al. |
| 2009/0174466 A1 | 7/2009 | Hsieh et al. |
| 2010/0188065 A1 | 7/2010 | Shiwaya |
| 2011/0062940 A1 | 3/2011 | Shvartsman |
| 2013/0147543 A1 | 6/2013 | Dai et al. |
| 2014/0070787 A1 | 3/2014 | Arno |
| 2014/0268888 A1 | 9/2014 | Lv |
| 2015/0015088 A1 | 1/2015 | Petersen |
| 2015/0061613 A1 | 3/2015 | Kondou |
| 2015/0084611 A1 | 3/2015 | Agrawal et al. |
| 2015/0280553 A1 | 10/2015 | Giuliano et al. |
| 2015/0311793 A1 | 10/2015 | Khayat et al. |
| 2016/0344214 A1 | 11/2016 | Petersen et al. |
| 2016/0352218 A1 | 12/2016 | Stauth |
| 2017/0126146 A1 | 5/2017 | Petersen |
| 2017/0149337 A1 | 5/2017 | Petersen |
| 2017/0163157 A1 | 6/2017 | Petersen |
| 2017/0244318 A1 | 8/2017 | Giuliano |
| 2017/0279348 A1 | 9/2017 | Kulkarni |
| 2017/0302093 A1 | 10/2017 | Petersen |
| 2018/0026518 A1 | 1/2018 | Liu et al. |
| 2018/0175726 A1 | 6/2018 | Petersen |
| 2019/0149041 A1 | 5/2019 | Larsen |
| 2019/0207519 A1 | 7/2019 | Chakraborty |
| 2019/0280618 A1 | 9/2019 | Yan |
| 2019/0341850 A1 | 11/2019 | Macri |
| 2019/0348913 A1 | 11/2019 | Zhang |
| 2020/0044578 A1 | 2/2020 | Mangudi |
| 2020/0091818 A1 | 3/2020 | Toni |
| 2020/0144909 A1 | 5/2020 | Baek |
| 2020/0212795 A1 | 7/2020 | Das |
| 2020/0295655 A1 | 9/2020 | Takahiro |
| 2020/0350817 A1 | 11/2020 | De |
| 2021/0050786 A1 | 2/2021 | Park |
| 2021/0099088 A1 | 4/2021 | Cannillo |
| 2021/0152082 A1 | 5/2021 | Ozanoglu |
| 2021/0152100 A1 | 5/2021 | Zillo |
| 2021/0203179 A1 | 7/2021 | Gambetta |
| 2021/0234462 A1 | 7/2021 | Cannillo et al. |
| 2021/0288576 A1 | 9/2021 | Rizzolatti |
| 2021/0391786 A1 | 12/2021 | Petersen |
| 2021/0391787 A1 | 12/2021 | Petersen |
| 2022/0038006 A1 | 2/2022 | Ellis |

FOREIGN PATENT DOCUMENTS

| | | |
|---|---|---|
| DE | 10 2016 217 040 A1 | 3/2018 |
| EP | 3582383 A2 | 12/2019 |
| WO | 2014/154390 A1 | 10/2014 |

OTHER PUBLICATIONS

German Office Action, File No. 10 2020 213 005.1, Applicant: Dialog Semiconductor (UK) Limited, dated Jun. 24, 2021, 6 pages.

"Split-Phase Control: Achieving Complete Soft-Charging Operation of a Dickson Switched-Capacitor Converter," by Yutian Lei et al., IEEE Transactions on power Electronics, vol. 31, No. 01, Jan. 2016, pp. 77-782.

U.S. Office Action, U.S. Appl. No. 16/386,735, Applicant: Holger Petersen, dated Feb. 10, 2020, 21 pages.

U.S. Notice of Allowance, U.S. Appl. No. 16/900,669, Applicant: Holger Petersen, dated Sep. 27, 2021, 29 pages.

U.S. Notice of Allowance, U.S. Appl. No. 16/386,735, Applicant: Holger Petersen, dated Jun. 10, 2020, 13 pages.

Co-pending U.S. Appl. No. 17/123,417, filed Dec. 16, 2020, "A Power Converter," by Holger Petersen, 27 pages.

Co-pending U.S. Appl. No. 17/396,591, filed Aug. 6, 2021, "Buck-Boost Converter," by Holger Petersen, 39 pages.

Co-pending U.S. Appl. No. 17/110,765, filed Dec. 3, 2020, "A Multi-Stage Power Converter," by Holger Petersen, 37 pages.

U.S. Office Action, U.S. Appl. No. 16/900,678, Applicant: Holger Petersen, dated Aug. 13, 2021, 24 pages.

Texas Instruments, "Introduction to the Series Capacitor Buck Converter," by Pradeep S. Shenoy, Application Report, SLVA750A—Apr. 2016. Revised May 2016, 15 pages.

U.S. Notice of Allowance, U.S. Appl. No. 17/110,765, Applicant: Holger Petersen, dated Jan. 23, 2023, 13 pages.

U.S. Notice of Allowance, U.S. Appl. No. 17/110,765, Applicant: Holger Petersen, dated Oct. 31, 2022, 13 pages.

U.S. Notice of Allowance, U.S. Appl. No. 17/123,417, Applicant: Holger Petersen, dated Mar. 16, 2022, 36 pages.

U.S. Notice of Allowance, U.S. Appl. No. 17/123,417, Applicant: Holger Petersen, dated Apr. 8, 2022, 12 pages.

U.S. Office Action, U.S. Appl. No. 17/110,765, Applicant: Holger Petersen, dated May 10, 2022, 47 pages.

U.S. Notice of Allowance, U.S. Appl. No. 16/900,678, Applicant: Holger Petersen, dated Jun. 3, 2022, 22 pages.

"A Hybrid Dual-Path Step-Down Converter with 96.2% Peak Efficiency using a 250Ω Large-DCR Inductor," by Yeunhee Huh et al., 2018 Symposium on VLSI Circuits Digest of Technical Papers, Jun. 18-22, 2018, pp. 225-226.

"A Hybrid Dual-Path Step-Down Converter with 96.2% Peak Efficiency using a 250Ω Large-DCR Inductor," by Yeunhee Huh et al., Journal of Solid-State Circuits, vol. 54, No. 4, Apr. 2019, pp. 959-967.

"Multiphase buck converters with extended duty cycle," by Yungtaek Jang et al., Twenty-First Annual IEEE Applied Power Electronics Conference and Exposition, APEC '06, Mar. 19-23, 2006, pp. 38-44.

"A Hybrid Inductor-Based Flying-Capacitor-Assisted Step-Up/Step-Down DC-DC Converter with 96.56% Efficiency," by Yong-Min Ju et al., 2017 IEEE International Solid-State Circuits Conference (ISSCC), Feb. 5-9, 2017, pp. 184-186.

"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.

"Multi-Level Conversion: High Voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.

"A Hybrid Switched-Capacitor/Inductor Converter for Small Conversion Ratios," by Norah Elena Nakibuuka, Thesis: M. Eng., Massachusetts Institute of Technology, Department of Electrical Engineering and Computer Science, 2013, May 2013, 69 pages.

"Analysis of Double Step-Down Two-Phase Buck Converter for VRM," by K. Nishijima et al, INTELEC 05—Twenty-Seventh International Telecommunications Conference, Sep. 18-22, 2005, pp. 497-502.

"Right-Half-Plane Zero Elimination of Boost Converter Using Magnetic Coupling With Forward Energy Transfer," by Behzad Poorali et al., IEEE Transactions on Industrial Electronics, vol. 66, No. 11, Nov. 2019, pp. 8454-8462.

(56) References Cited

OTHER PUBLICATIONS

"Fully Integrated Buck Converter with 78% Efficiency at 365mW Output Power Enabled by Switched-Inductor-Capacitor Topology and Inductor Current Reduction Technique," by Nghia Tang et al., 2019 IEEE International Solid- State Circuits Conference—(ISSCC), Feb. 17-21, 2019, pp. 153-154.

"A New Approach to Low Ripple-Noise Switching Converters On the Basis of Switched-Capacitor Converters," by Tohru Umeno et al., 1991., IEEE International Sympoisum on Circuits and Systems, Jun. 11-14, 1991, pp. 1077-1080.

"Zero Inductor Voltage Multilevel Bus Converter," by Samuel Webb et al., 2018 IEEE Applied Power Electronics Conference and Exposition (APEC), Mar. 4-8, 2018, pp. 2175-2182.

"Three-Level Buck Converter for Envelope Tracking Applications," by Vahid Yousefzadeh et al., IEEE Transactions on Power Electronics, vol. 21, No. 2, Mar. 2006, pp. 549-552.

* cited by examiner ated to a common assignee, and which are incorporated by reference in their entirety.

HYBRID MULTI-PHASE POWER CONVERTER WITH PHASE SHEDDING

RELATED PATENT APPLICATIONS

This application is related to application Ser. No. 17/123,417, filed on Dec. 16, 2020 (ref: DS20-003G), application Ser. No. 17/110,765, filed on Dec. 3, 2020 (ref: DS20-002G), application Ser. No. 16/900,678, filed on Jun. 12, 2020 (ref: DS20-001_2 G), application Ser. No. 16/900,669, filed on Jun. 12, 2020 (ref: DS20-001G), which are assigned to a common assignee, and which are incorporated by reference in their entirety.

TECHNICAL FIELD

The present disclosure relates to a multi-phase power converter and in particular to a multi-phase power converter with phase shedding capability.

BACKGROUND

Multi-phase buck converters using a flying capacitor, four switches and two inductors have been reported in the prior art, including 1) U.S. Pat. No. 7,230,405, Jang, "Non-isolated Power Conversion System having multiple switching Power Converters", 2004; 2) Nishijima, "Analysis of Double Step-Down Two Phase Buck Converter for VRM", IEEE, 2005" and 3) Jang, "Multi-Phase Buck Converters with Extended Duty Cycle", IEEE, 2006. The topology described in these documents drops 50% of the input voltage via switching capacitance, so that the inductive stages operate like a multi-phase buck of half the input voltage.

As highlighted in Shenoy, "Introduction to Series Capacitor Buck Converter", Texas Instruments SLVA750A, 2016, this topology is limited by a reduced maximum output voltage (or minimum input voltage) and the impracticality of phase shedding. The theoretical maximum output voltage $V_{OUT} < V_{IN}/4$ causes issues especially for battery powered applications in which the converter input voltage may drop by 50% and more.

Patent application Ser. No. 17/123,417 describes a derivative dual-flying capacitor topology and proposes to increase the maximum output voltage by introducing an additional magnetization switching state. These topologies are limited by increased core loss from two or more inductors, especially at mid and low load current, resulting in reduced converter efficiency.

SUMMARY

It is an object of the disclosure to address one or more of the above mentioned limitations.

According to a first aspect of the disclosure, there is provided a power converter for providing an output voltage with an output-to-input conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; wherein the power converter comprises a reservoir capacitor, a first flying capacitor, a first inductor and a second inductor coupled to a network of switches; and a driver adapted to drive the network of switches with a sequence of states during a drive period; wherein the power converter is operable in a first mode to deliver an output current using both the first inductor and the second inductor and a second mode to deliver the output current using the first inductor and without using the second inductor; wherein when a load current is above a threshold value the driver drives the network of switches in a first sequence of states to operate the power converter in the first mode, and when the load current is equal or below the threshold value the driver drives the network of switches in a second sequence of states to operate the power converter in the second mode.

Optionally, the second sequence of states comprises a first state (D1') and a second state (DV'), wherein in the first state (D1') the first port is coupled to the second port via a path comprising the first flying capacitor and the first inductor; and wherein the ground is coupled to the second port via a path comprising the reservoir capacitor and the first inductor; wherein in the second state (DV') the ground in coupled to the ground via a path that includes the first flying capacitor and the reservoir capacitor; and wherein the ground is coupled to the second port via a path that includes the first inductor.

Optionally, the network of switches comprises a first switch (S1) to couple the first flying capacitor to the first port; a second switch (S7) to couple the reservoir capacitor to the first inductor; a third switch (S8) to couple the reservoir capacitor to the first flying capacitor; a first ground switch (S4) to couple the first inductor to ground; a second ground switch (S3) to couple the second inductor to ground; and a first inductor switch (S2) to couple the first flying capacitor to the second inductor.

Optionally, the power converter comprises a second flying capacitor; wherein the network of switches comprises a fourth switch (S5) to couple the second flying capacitor to the first port; and a second inductor switch (S6) to couple the second flying capacitor to the first inductor.

Optionally, the power converter is operable in a third mode for transiting between the first mode and the second mode or for providing a steady state unbalanced inductor current.

Optionally, the driver is adapted to drive the network of switches in a third sequence of states to operate the power converter in the third mode, the third sequence of states comprising a third state (D1), a fourth state (D1T), a fifth state (D2) and a sixth state (D2T).

Optionally, in the third state (D1) the first port is coupled to the second port via a path comprising the first flying capacitor and the first inductor; and wherein the ground is coupled to the second port via two paths, a first path comprising the second inductor, and a second path comprising the second flying capacitor and the first inductor; and wherein in the fourth state (D1T) the first port is coupled to the second port via a path comprising the first flying capacitor and the first inductor; and wherein the ground is coupled to the second port via two paths, a first path comprising the reservoir capacitor and the first inductor and a second path comprising the second inductor.

Optionally, in the fifth state (D2) the first port is coupled to the second port via a path comprising the second flying capacitor and the second inductor; and wherein the ground is coupled to the second port via two paths, a first path comprising the first inductor, and a second path comprising the first flying capacitor and the second inductor; and wherein in the sixth state (D2T) the first port is coupled to the second port via a path comprising the second flying capacitor and the second inductor; and wherein the ground is coupled to the ground via a path comprising the first flying capacitor and the reservoir capacitor and wherein the ground is coupled to the second port via a path comprising the first inductor.

Optionally, the driver is configured to gradually increase a duty cycle of the fourth state (D1T) and the sixth state (D2T) to reduce a current through the second inductor.

Optionally, in the first mode the driver is adapted to drive the network of switches using a sequence of states comprising the third state (D1), the fifth state (D2) and a seventh state (DV).

Optionally, in the seventh state (DV) the ground port is coupled to the second port via a first path comprising the first inductor and a second path comprising the second inductor.

Optionally, the power converter is operable in a fourth mode; wherein when the output-to-input conversion ratio is greater than 0.25 for step-down conversion or smaller than 4 for step-up conversion, the driver is adapted to drive the network of switches in a fourth sequence of states to operate the power converter in the fourth mode.

Optionally, wherein the fourth sequence of states comprises the third state (D1), the fifth state (D2), an eight state (DP), a ninth state (D1A), and a tenth state (D2A); wherein in the eight state (DP) the first port is coupled to the second port via a first path comprising the first flying capacitor and the first inductor; and a second path comprising the second flying capacitor and the second inductor; wherein in the ninth state (D1A) the ground in coupled to the second port via a first path that includes the second flying capacitor and the first inductor; and a second path that includes the second inductor; wherein in the tenth state (D2A) the ground in coupled to the second port via a first path that includes the first flying capacitor and the second inductor; and a second path that includes the first inductor.

According to a second aspect of the disclosure there is provided a method of converting power with an output-to-input conversion ratio, the method comprising providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a reservoir capacitor, a first flying capacitor, a first inductor and a second inductor coupled to a network of switches; and a driver adapted to drive the network of switches with a sequence of states during a drive period; wherein the power converter is operable in a first mode to deliver an output current using both the first inductor and the second inductor and a second mode to deliver the output current using the first inductor and without using the second inductor;

driving the network of switches in a first sequence of states to operate the power converter in the first mode when a load current is above a threshold value;

driving the network of switches in a second sequence of states to operate the power converter in the second mode when the load current is equal or below the threshold value.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which.

DESCRIPTION

Figure 1:
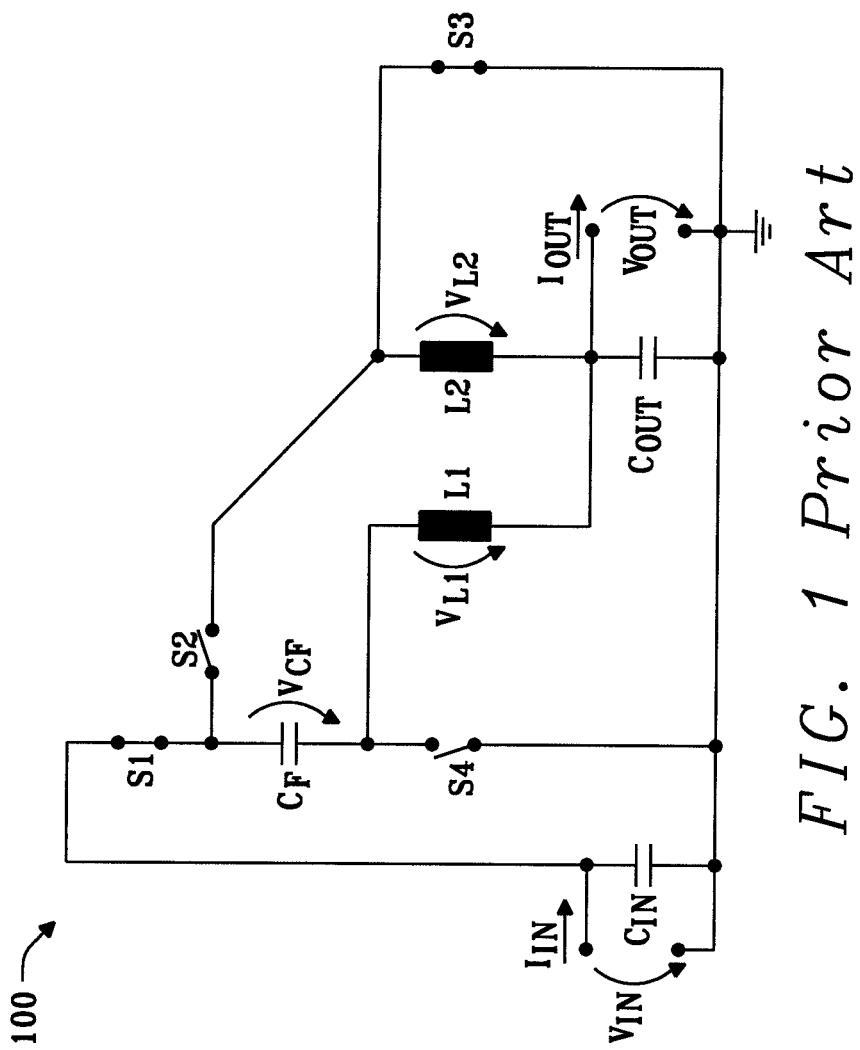
FIG. 1 is a series capacitor buck converter according to the prior art.

FIG. 1 illustrates a series capacitor buck converter according to the prior art. Description of such a circuit topology can be found in several documents including 1) U.S. Pat. No. 7,230,405, Jang, "Non-isolated Power Conversion System having multiple switching Power Converters", 2004; 2) Nishijima, "Analysis of Double Step-Down Two Phase Buck Converter for VRM", IEEE, 2005" and 3) Jang, "Multi-Phase Buck Converters with Extended Duty Cycle", IEEE, 2006.

The topology of FIG. 1 is used for pulling a current from the input terminal via a flying capacitor, hence dropping the inductor magnetization voltage to $V_L=V_{IN}-V_{CF}-V_{OUT}$. For a duty cycle D<0.5, the flying capacitor voltage $V_{CF}$ ideally converges to:

$$V_{CF} = \frac{V_{IN}}{2} \quad D \in [0, 0.5] \tag{1}$$

This results in a switching operation like a dual-phase buck converter with half the input voltage.

Non-ideal timings, asymmetric parasitic impedance, and tolerances of components (inductors, capacitors) may result in asymmetric operation with the need to regulate the voltage across the flying capacitors, for instance via non-identical duty cycles for the magnetization of inductor $L_1$ and $L_2$.

Dropping the input voltage by half via the flying capacitance reduces inductor current ripple and permits the use of power field effect transistors FETs S3 and S4 with reduced voltage rating. Devices of lower voltage rating typically offer an improved Figure of Merit, that is a smaller specific resistance and a smaller gate capacitance. For small voltage conversion ratio, the inductor demagnetization switches towards the ground terminal (FETs S3 and S4) are the most heavily loaded current paths. The relationship between input and output voltage is obtained by applying the volt-sec balance principle to the voltages of the two inductors $L_1$ and $L_2$:

$$\frac{V_{OUT}}{V_{IN}} = \frac{D}{2} \quad D \in [0, 0.5] \tag{2}$$

From equation (2) it can be derived that the maximum $V_{OUT}/V_{IN}$ conversion ratio of the converter is less than $V_{OUT}/V_{IN} = ¼$ (at D=0.5).

For D>0.5 the magnetization phases for the inductors $L_1$ and $L_2$ overlap as the switches S1 and S2 need to be closed in parallel. Consequently, the switch S3 needs to double its voltage rating. In addition, the magnetization voltage of inductor $L_2$ increases part time to $V_L = V_{IN} - V_{OUT}$ hence increasing inductor core losses. In this case the phase including inductor $L_2$ would operate in a similar fashion as a traditional buck but with 2× high voltage rated FETs connected in series during inductor magnetization and a high voltage rated low side FET for inductor demagnetization.

Figure 2:
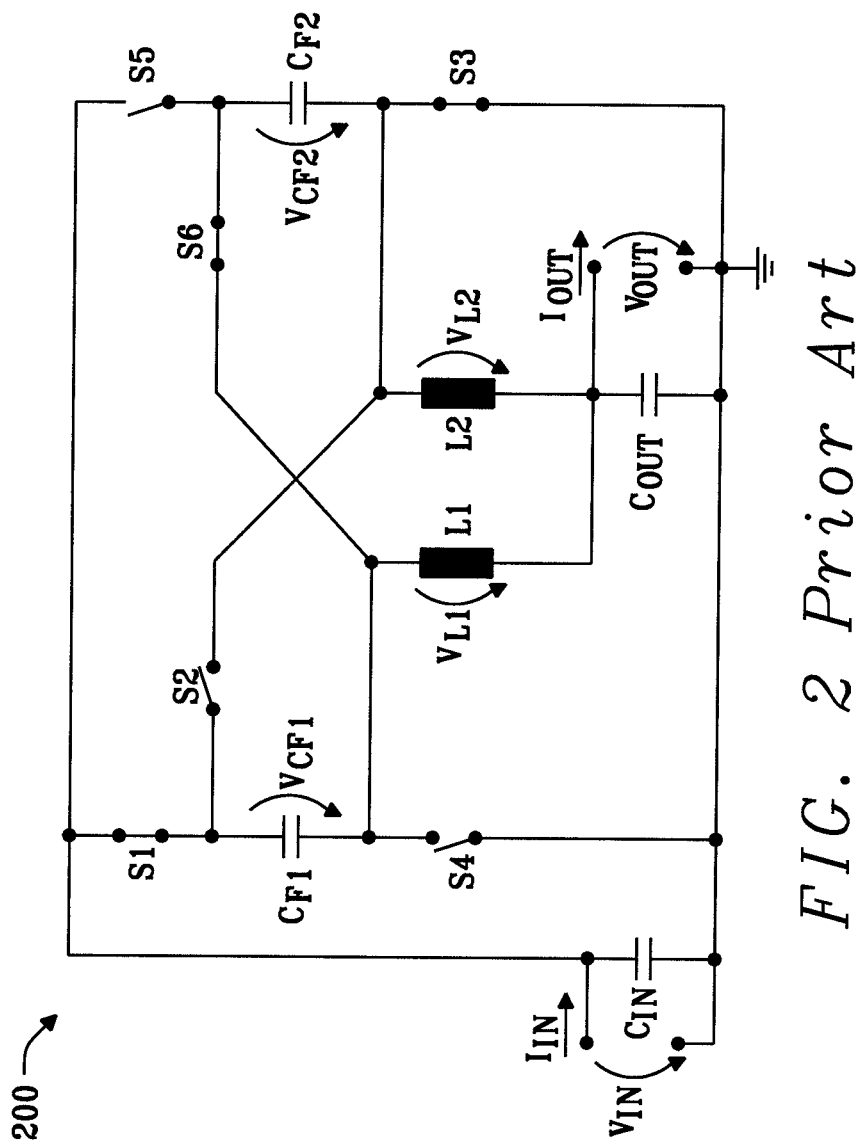
FIG. 2 is a derivative topology of the converter circuit of FIG. 1 according to the prior art.

FIG. 2 illustrates a derivative topology of the converter circuit of FIG. 1 as shown in U.S. Pat. No. 7,230,405, and "Multi-Phase Buck Converters with Extended Duty Cycle", IEEE, 2006.

The topology of FIG. 2 permits to reduce conduction losses and input current ripple (by 50%). The flying capacitor voltages ideally converge to:

$$V_{CF1} = V_{CF2} = \frac{V_{IN}}{2} \quad D \in [0, 0.5] \tag{3}$$

at a voltage conversion ratio following (2).

FIG. 3A-3H illustrate several operation states of the circuit of FIG. 2.

Figures 3A, 3B:
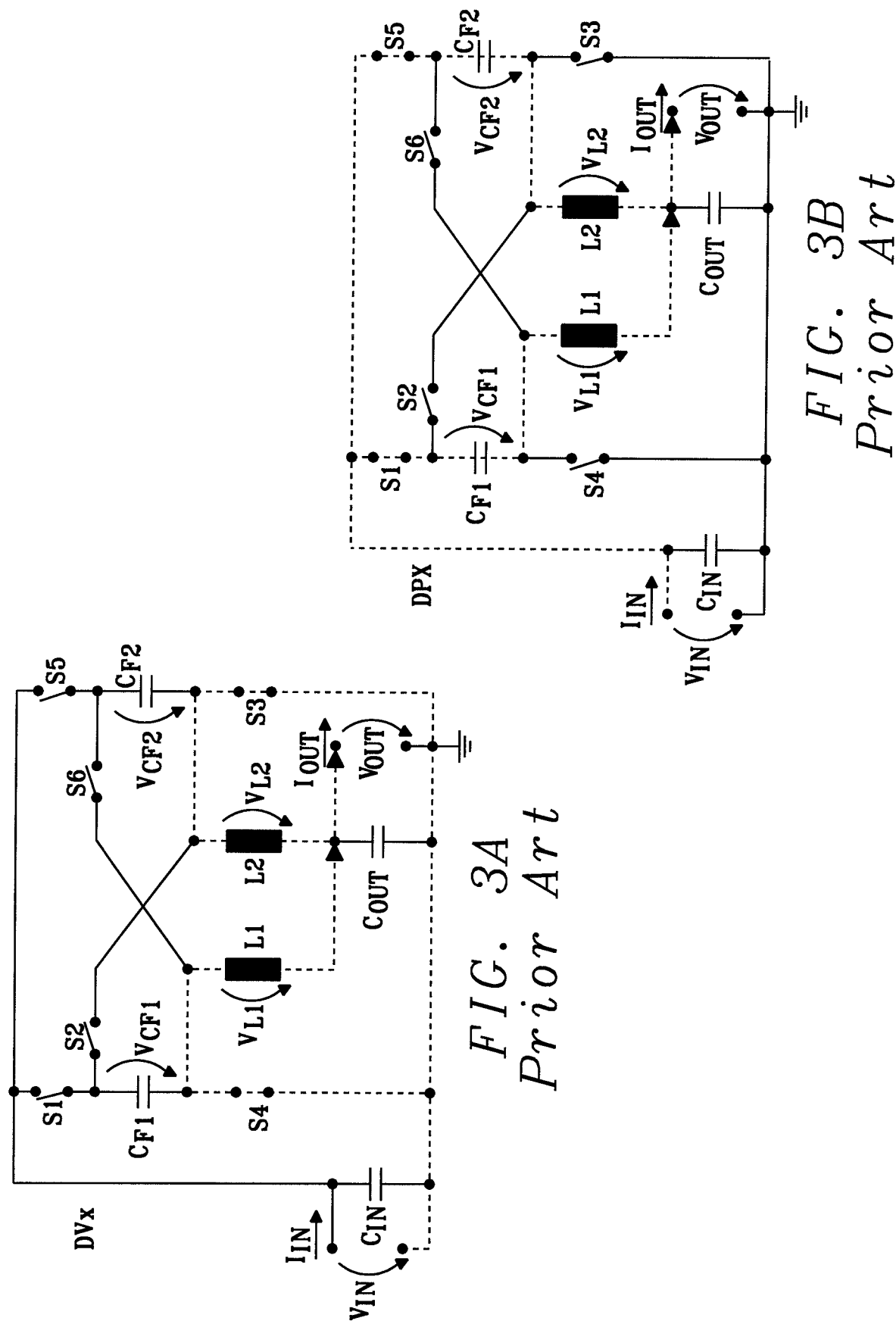
FIGS. 3A-3H are operational states of the circuit of FIG. 2.
Figures 3C, 3D:
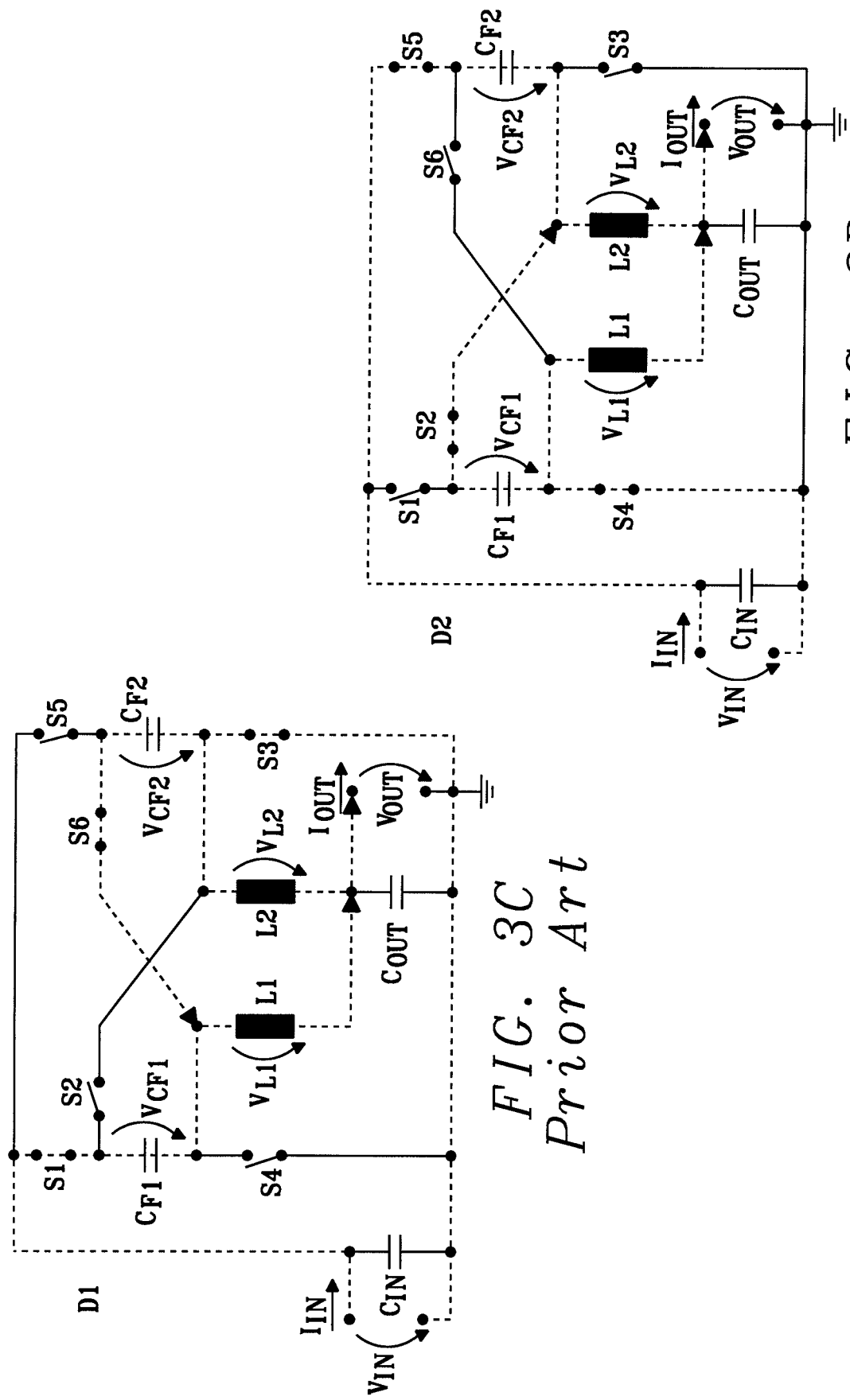

The converter of FIG. 2 operates at small voltage conversion ratios most of its switching sequence in a de-magnetization state DV as shown in FIG. 3A.

In the DV state both inductors are de-magnetized during the provision of output current from the ground. To fulfill the volt x second balance across the inductors a certain duration of the switching sequence will have to be configured according to a switching state D1 shown in FIG. 3C, and the switching state D2 shown in FIG. 3D. In the state D1 the inductor $L_1$ is magnetized. In the state D2 the inductor $L_2$ is magnetized.

The corresponding switching operation would typically look like a repeated sequence of states D1→DV1→D2→DV2→D1→ . . . . The relationship between input and output voltage is obtained by applying the volt-sec balance principle to the voltages of the two inductors $L_1$ and $L_2$:

$$\frac{V_{OUT}}{V_{IN}} = \frac{D}{2} \quad D1 = D2 = D, DV1 = DV2 = \frac{1-2D}{2} \quad D \in [0, 0.5] \tag{4}$$

Figures 3E, 3F:
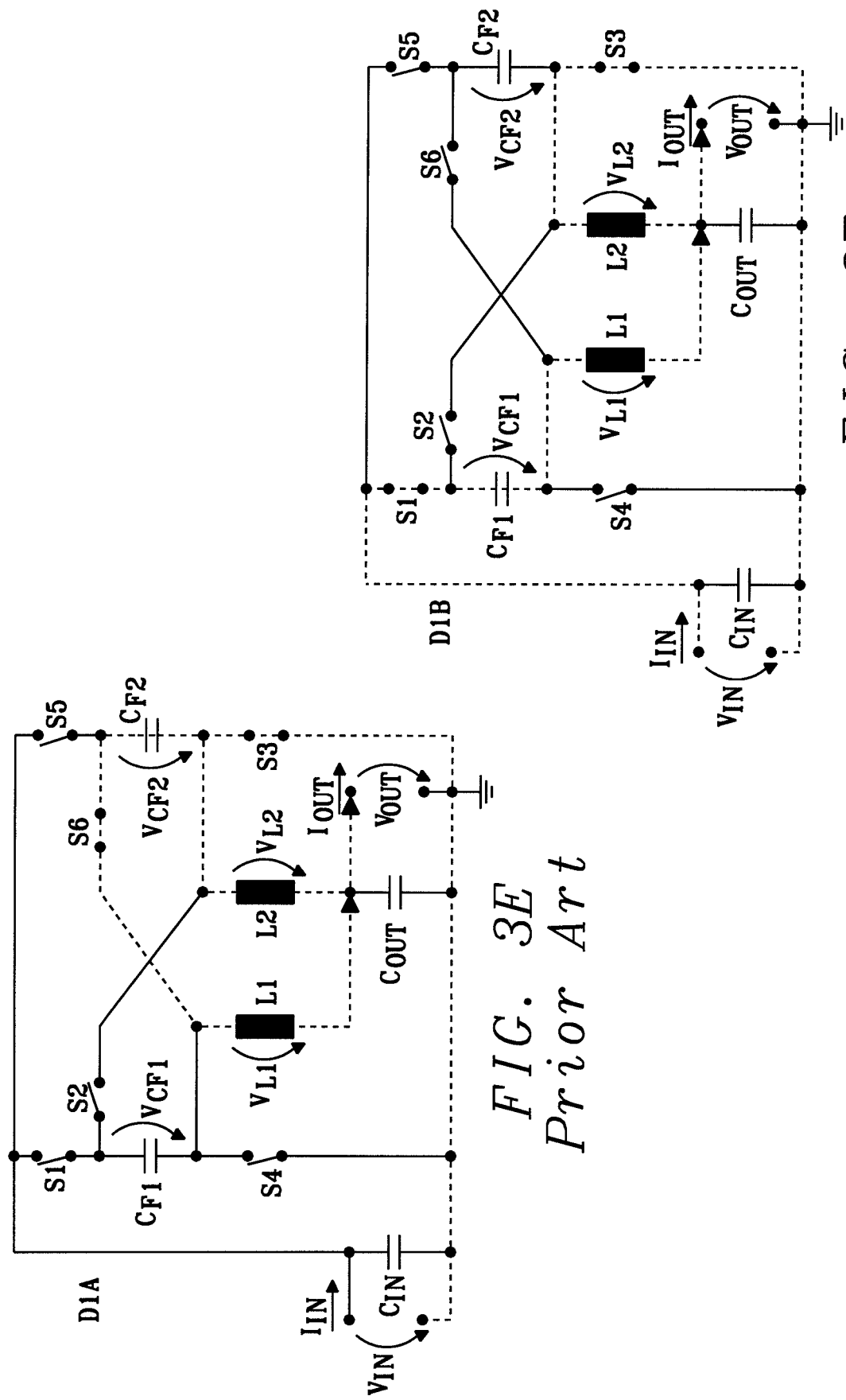
Figures 3G, 3H:
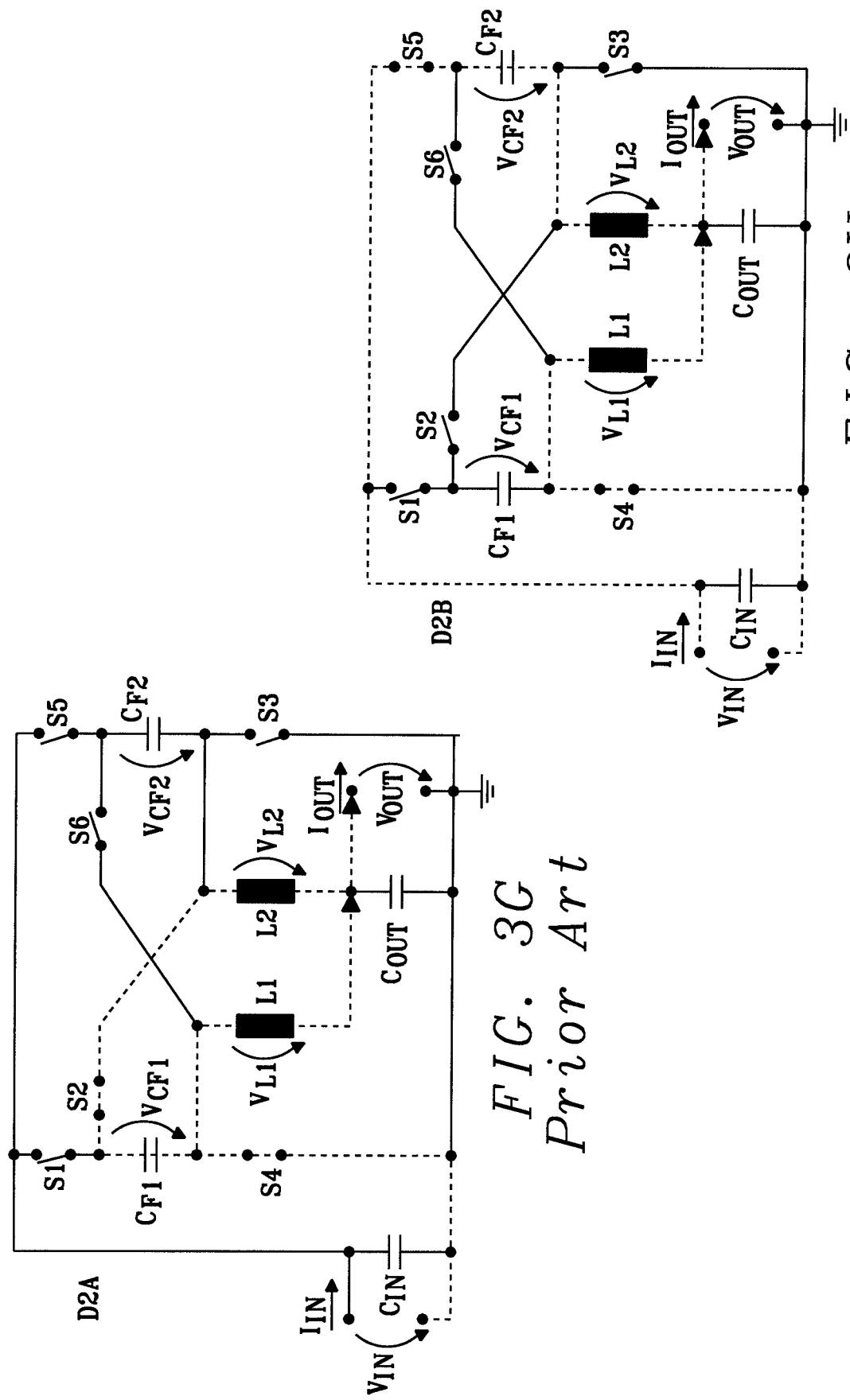

The topology of FIG. 2 can also be operated with four states. Such a 4-phase interleaved operation effectively splits the operation states D1 and D2 into two sub-states D1A & D1B and D2A & D2B, respectively. The states D1A and D1B are shown in FIGS. 3E and 3F. The states D2A and D2B are shown in FIGS. 3G and 3H.

The corresponding switching operation would typically look like a repeated sequence of states D1A→DV1→D1B→DV2→D2B→DV3→D2A→DV4→D1A→ . . . with flying capacitor voltages and voltage conversion ratio following equations (2) and (4), respectively.

Patent application Ser. No. 17/123,417 proposes to increase the maximum output voltage by introducing an additional magnetization switching state DP that may be inserted into a modified converter switching sequence for D>0.5. The state DP is shown in FIG. 3B and the corresponding switching operation would typically look like a sequence of states: D1→D1A→DP→D2A→D2→(repeat). The corresponding relationship between input and output voltage is obtained by applying the volt-sec balance principle to the voltages of the two inductors $L_1$ and $L_2$:

$$\frac{V_{OUT}}{V_{IN}} = \frac{D+1}{6} D1 = D2 = 1 - D, \tag{5}$$

$$D1A = D2A = DP = \frac{2D-1}{3} D \in [0.5, 1]$$

Alternatively, the state DP may be split into two sub-states DP1 and DP2 with a corresponding example state of sequence: D1→DP1→D1A→D2A→DP2→D2→(repeat).

For all switching sequences the charge injected into a flying capacitor by a current flowing through an inductor from the input terminal can only be balanced via a current flowing through the other inductor from ground. This means that the required charge balance across the flying capacitors results in switching current through both inductors, effectively prohibiting phase shedding.

Figure 4:
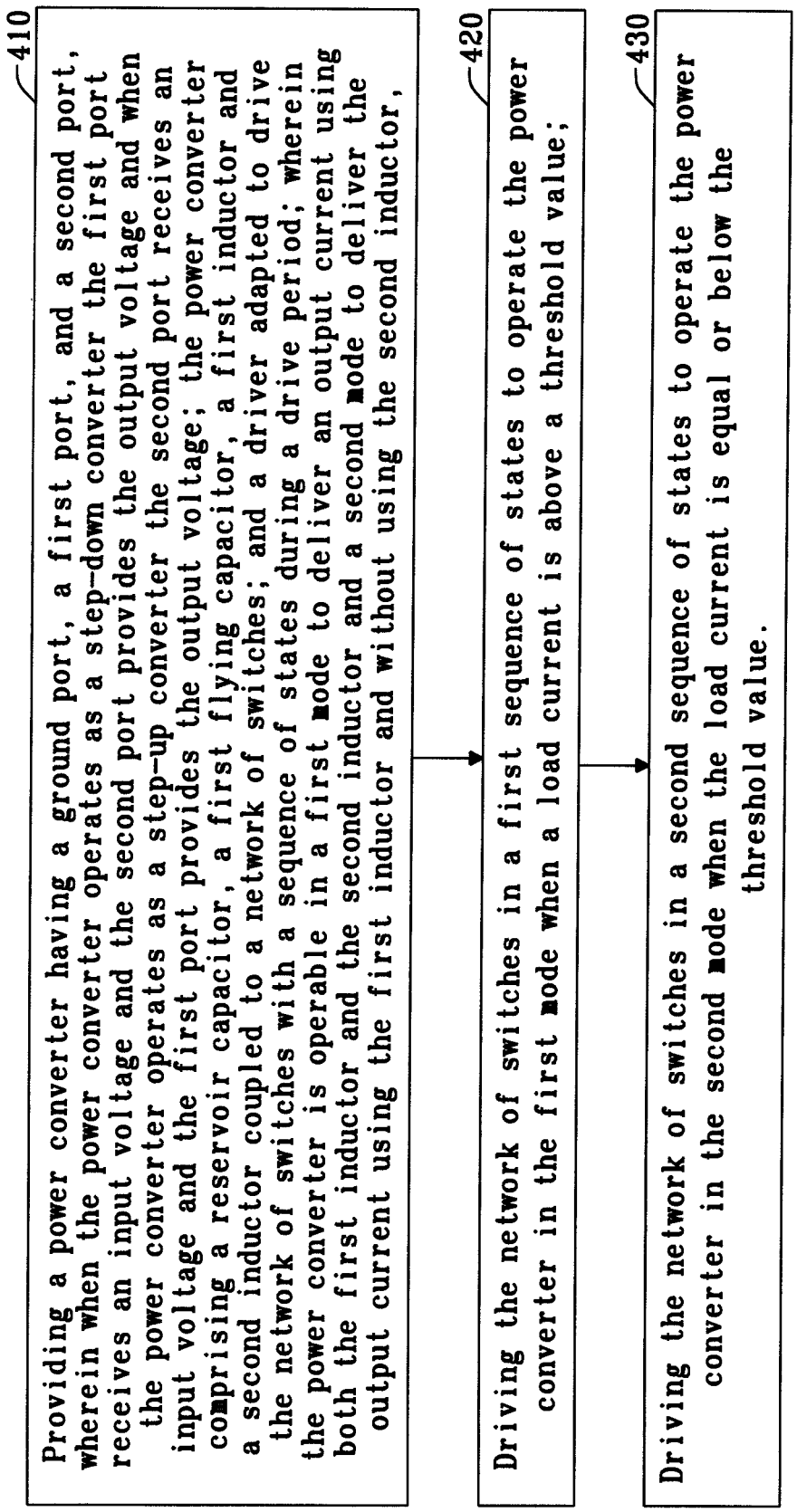
FIG. 4 is a flow chart of a method for converting power with an output-to-input conversion ratio according to the disclosure.

FIG. 4 is a flow chart of a method for converting power with an output-to-input conversion ratio. At step 410 a power converter having a ground port, a first port, and a second port is provided. When the power converter operates as a step-down converter the first port receives an input voltage and the second port provides the output voltage and when the power converter operates as a step-up converter the second port receives an input voltage and the first port provides the output voltage. The power converter has a reservoir capacitor, a first flying capacitor, a first inductor and a second inductor coupled to a network of switches and a driver. The driver is adapted to drive the network of switches with a sequence of states during a drive period. The power converter is operable in a first mode to deliver an output current using both the first inductor and the second inductor and a second mode to deliver the output current using the first inductor and without using the second inductor.

At step 420 the network of switches is driven in a first sequence of states to operate the power converter in the first mode when a load current is above a threshold value.

At step 430 the network of switches is driven in a second sequence of states to operate the power converter in the second mode when the load current is equal or below the threshold value.

Using this approach improves efficiency under mid and light load current.

Figure 5:
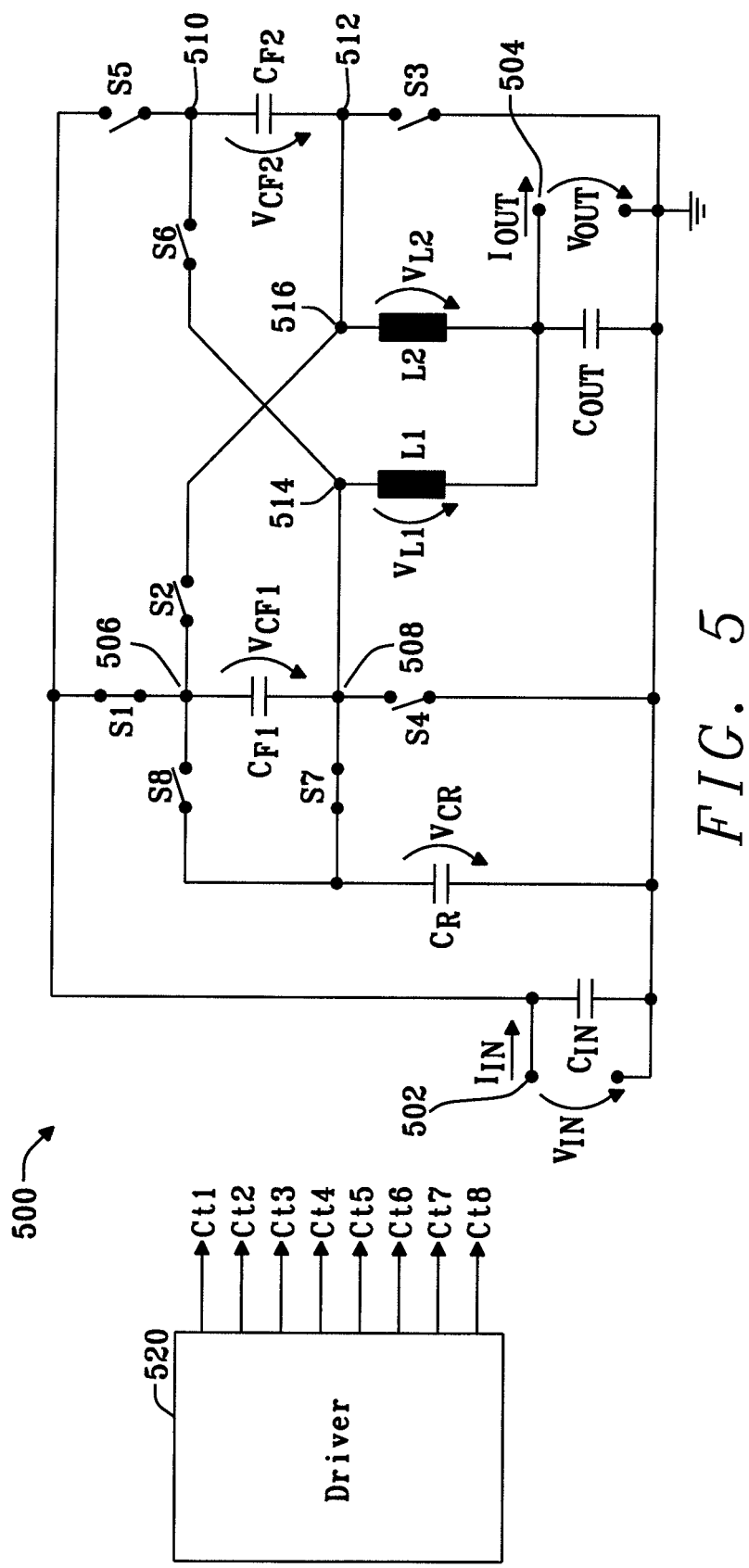
FIG. 5 is a is a diagram of a DC-DC converter for implementing the method of FIG. 4.

FIG. 5 is a diagram of a DC-DC converter for implementing the method of FIG. 4. The power converter 500 has a ground port, a first port 502, and a second port 504. The power converter 500 may be operated as a step-down converter or as a step-up converter. When operating as a step-down converter the first port 502 receives an input voltage and the second port 504 provides the output voltage. Conversely, when the power converter operates as a step-up converter the second port 504 receives an input voltage and the first port 502 provides the output voltage. In FIG. 5, the converter 500 is described as a step-down converter, in this case the first port 502 may be referred to as the input port, while the second port 504 may be referred to as the output port.

The power converter 500 has three capacitors ($C_R$, $C_{F1}$, $C_{F2}$) and two inductors ($L_1$, $L_2$) coupled to a network of switches formed of eight switches (S1-S8).

The capacitor $C_R$ is connected to a fixed ground voltage and may be referred to as a reservoir capacitor. Another two reservoir capacitors $C_{IN}$ and $C_{OUT}$ may be provided at the input and output ports respectively. The capacitors $C_{F1}$ and $C_{F2}$ have terminals provided with varying voltages and may be referred to as flying capacitors.

The first flying capacitor $C_{F1}$ has a first terminal, at node 506, coupled to the first port 502 via a first input switch S1; and a second terminal, at node 508, coupled to ground via a first ground switch S4. The first ground switch S4 also couples the first inductor to ground. Similarly, the second flying capacitor $C_{F2}$ has a first terminal, at node 510, coupled to the first port 502 via a second input switch S5; and a second terminal, at node 512, coupled to ground via a second ground switch S3. The second ground switch S3 also couples the second inductor to ground.

The first inductor $L_1$ has a first terminal at switching node 514 (LX1) and a second terminal coupled to the second port 504. Similarly the second inductor $L_2$ has a first terminal at switching node 516 (LX2) and a second terminal coupled to the second port 504.

The first terminal of $C_{F1}$ is coupled to the first terminal of $L_2$ via a first inductor switch S2.

Similarly, the first terminal of $C_{F2}$ is coupled to the first terminal of $L_1$ via a second inductor switch S6.

The reservoir capacitor $C_R$ has a first terminal coupled to ground and a second terminal coupled to the first terminal of $C_{F1}$ via switch S8, and to the second terminal of $C_{F1}$ via switch S7. The switch S7 also couples the reservoir capacitor $C_R$ to the first inductor at node 508/514.

A driver 520 is provided to drive the network of switches with a sequence of states during a drive period. The driver 520 is configured to generate eight control signals Ct1-Ct8 to operate the switches S1-S8 respectively.

When a load current is above a threshold value the driver drives the network of switches in a first sequence of states to operate the power converter in a first mode. When the load current is equal or below the threshold value the driver drives the network of switches in a second sequence of states to operate the power converter in a second mode, referred to as phase shedding mode. To facilitate smooth transition between the first mode and the second mode the driver may drive the network of switches in a third sequence of states to operate the power converter in a third mode, referred to as transition mode. When the target output-to-input conversion ratio $V_{OUT}/V_{IN}$ is greater than 0.25 for step-down conversion, or smaller than 4 for step-up conversion the driver drives the network of switches in a fourth sequence of states to operate the power converter in a fourth mode, referred to as extended mode.

In the first mode an output current is delivered to the output port using both the first inductor $L_1$ and the second inductor $L_2$. In the second mode the output current is delivered using the first inductor $L_1$ and without using the second inductor $L_2$.

In the first mode, the first sequence of states may include several states DVx, D1 and D2 as described with reference to FIGS. 6A, 6C and 6D. The first mode may also include the states D1A (FIG. 6E), D2A (FIG. 6F), D1B (implemented like in FIG. 3F) and D2B (implemented like in FIG. 3H). The state DP (FIG. 6B), could also be included, for instance to replace the states D1B and D2B when conversion rations >0.25 are required.

Figure 6A:
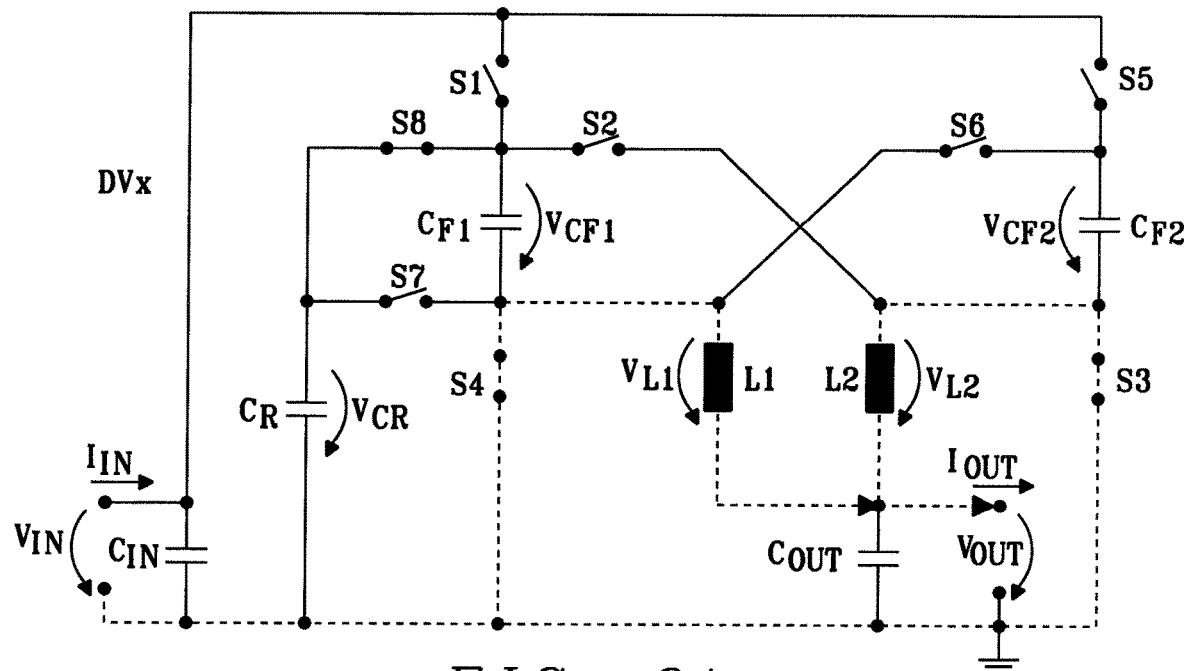
FIG. 6A is a diagram of the converter of FIG. 5 operating in a de-magnetizing state DVx.

FIG. 6A illustrates the DC-DC converter of FIG. 5 operating in a de-magnetizing state DVx. In this state, the switches S3, S4 are closed while the remaining switches S1, S2, S5-S7 are open. The ground port is coupled to the second port 504 via two paths; a first path comprising S4 and $L_1$, and a second path comprising S3 and $L_2$.

The switch S8 may optionally be closed to implement in combination with switching states D1 and D2 an automatic regulation of the voltages across the flying capacitor(s) and to force the voltage $V_{CR}$ across the reservoir capacitor $C_R$ to the same voltage range as the voltage $V_{CF1}$ across flying capacitor $C_{F1}$.

Figure 6B:
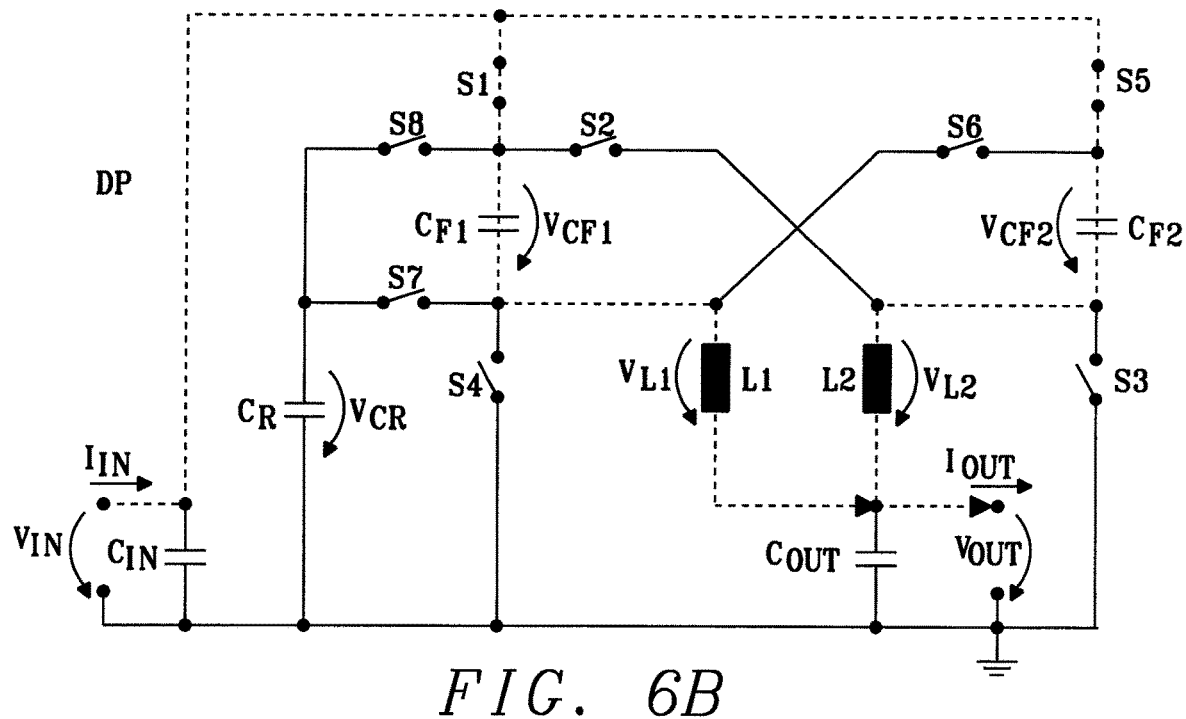
FIG. 6B is a diagram of the converter of FIG. 5 operating in a magnetizing state DP.

FIG. 6B illustrates the DC-DC converter of FIG. 5 operating in a magnetization state DP. In this state, the switches S1, S5 are closed while the remaining switches S2-S4, S6-S8 are open. The first port is coupled to the second port 504 via two paths; a first path comprising S1, $C_{F1}$, and $L_1$, and a second path comprising S5, $C_{F2}$ and $L_2$.

Figure 6C:
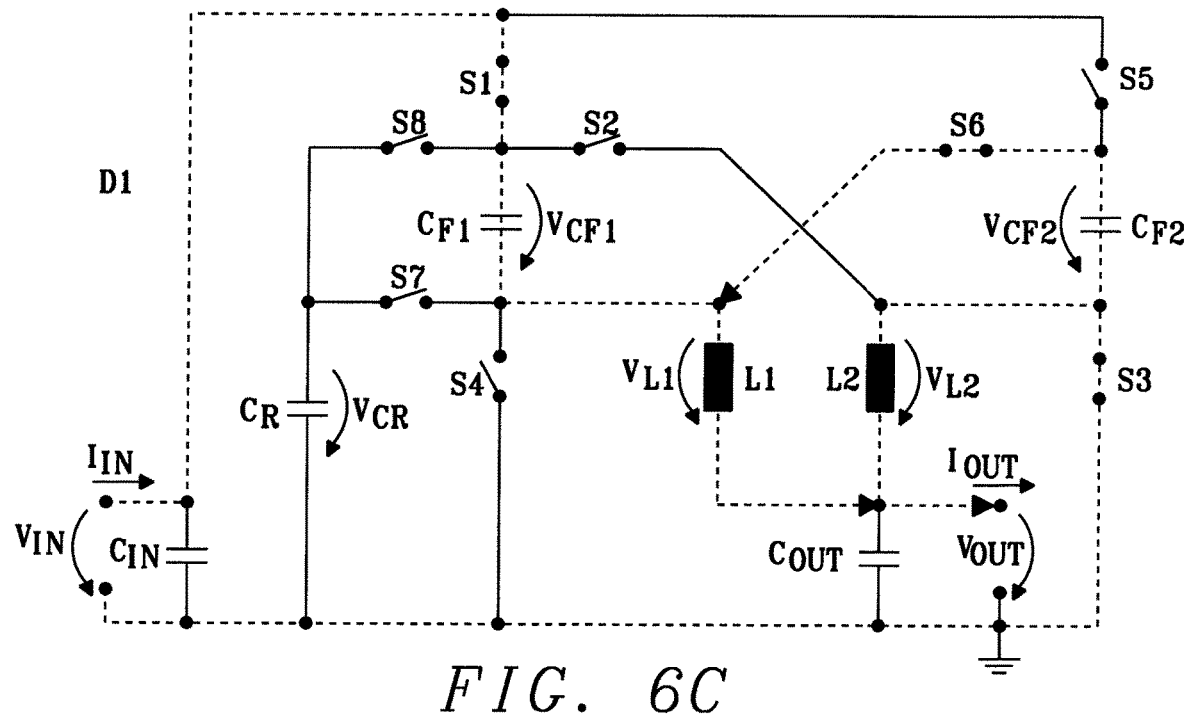
FIG. 6C is a diagram of the converter of FIG. 5 operating in another state D1.

FIG. 6C illustrates the DC-DC converter of FIG. 5 operating in a state D1. In this state, the switches S1, S3, S6 are closed while the switches S2, S4, S5, S8 are open. The first port is coupled to the second port via a path comprising S1, the first flying capacitor $C_{F1}$ and the first inductor $L_1$. The ground is coupled to the second port via two paths: a first path comprising S3, the second inductor $L_2$, and a second path comprising S3, the second flying capacitor $C_{F2}$, S6 and the first inductor $L_1$. In this example the switch S7 is open, however in an alternative operation the switch S7 may be closed during the state D1.

Figure 6D:
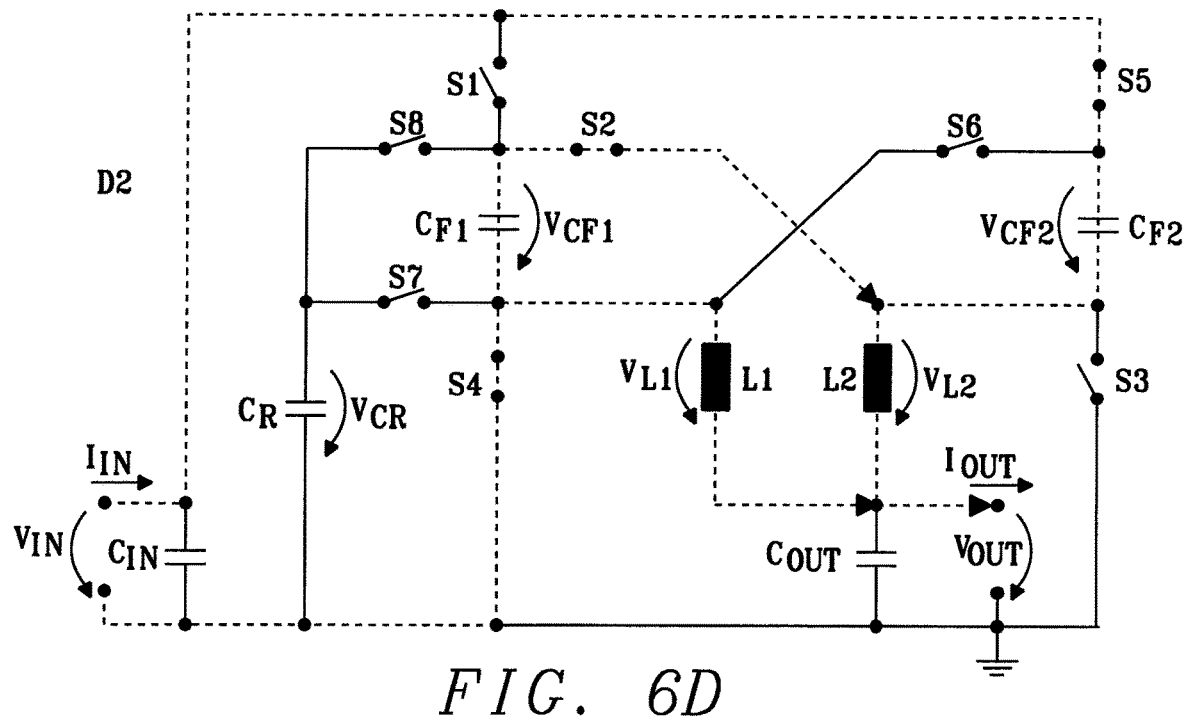
FIG. 6D is a diagram of the converter of FIG. 5 operating in another state D2.

FIG. 6D illustrates the DC-DC converter of FIG. 5 operating in a state D2. In this state, the switches S2, S4, S5 are closed while the remaining switches S1, S3, S6, S7, S8 are open. The first port is coupled to the second port via a path comprising S5, $C_{F2}$ and $L_2$. The ground is coupled to the second port via two paths: a first path comprising S4, $L_1$, and a second path comprising S4, $C_{F1}$, S2 and the inductor $L_2$.

Figure 6E:
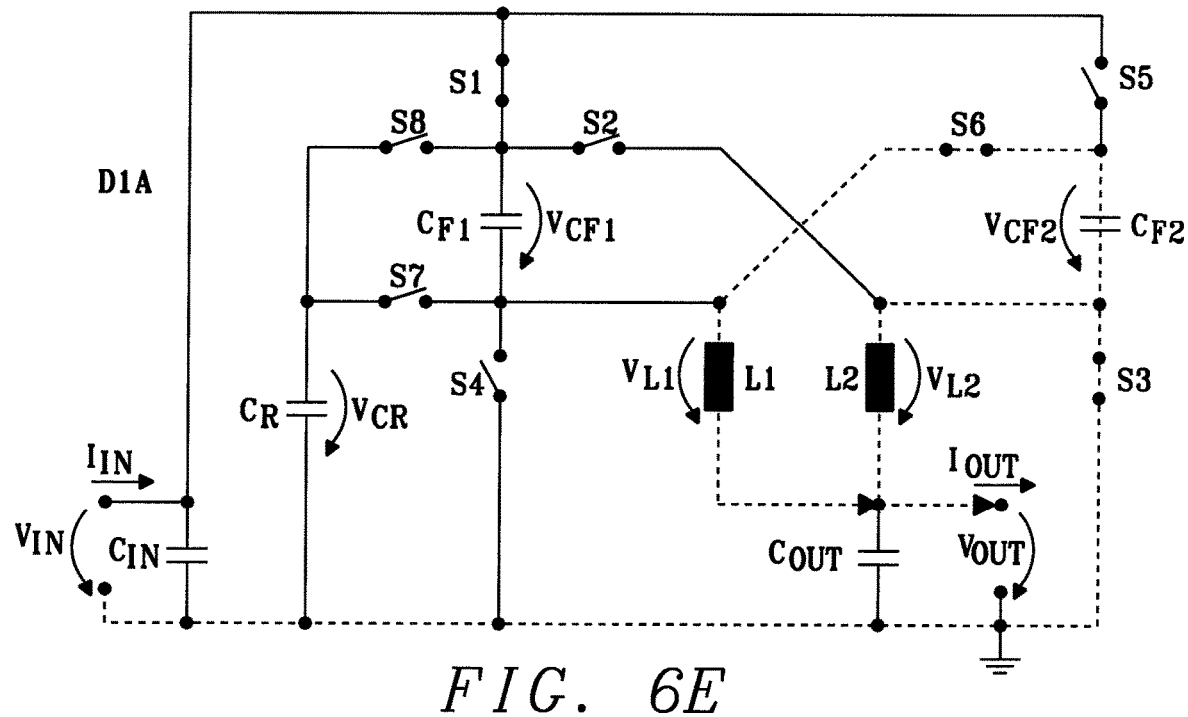
FIG. 6E is a diagram of the converter of FIG. 5 operating in another state D1A.

FIG. 6E illustrates the DC-DC converter of FIG. 5 operating in a state D1A. In this state, the switches S3, S6 are closed while the switches S2, S4, S5, S7, S8 are open. The ground port is coupled to the second port via two paths: a first path comprising S3 and $L_2$; and a second path that includes S3, $C_{F2}$, S6 and the inductor $L_1$.

Figure 6F:
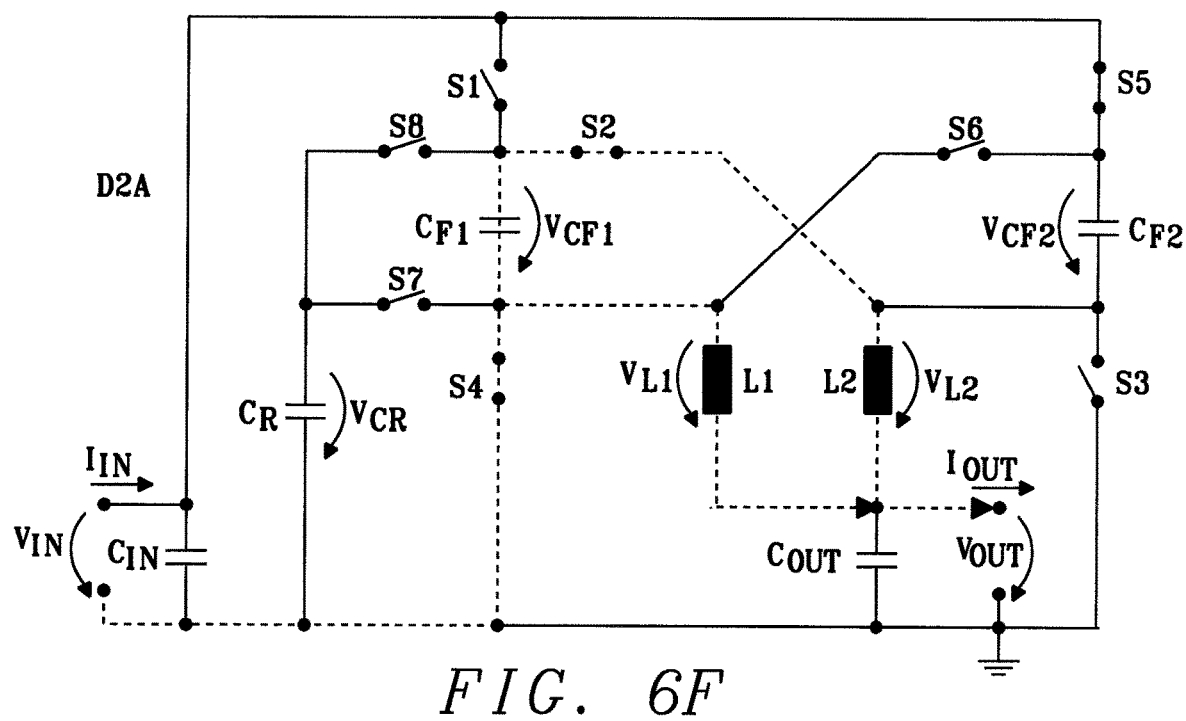
FIG. 6F is a diagram of the converter of FIG. 5 operating in another state D2A.

FIG. 6F illustrates the DC-DC converter of FIG. 5 operating in a state D2A. In this state, the switches S2, S4 are closed while the switches S1, S3, S6, S7, S8 are open. The ground port is coupled to the second port via two paths: a first path comprising S4 and L₁; and a second path that includes S4, $C_{F1}$, S2 and the inductor L₂.

When the target output-to-input conversion ratio $V_{OUT}/V_{IN}$ is greater than 0.25 for step-down conversion, or smaller than 4 for step-up conversion the driver operates the power converter in the fourth mode.

In the fourth mode the switching sequence may include the states D1, D2, DP, D1A, D2A as shown in FIGS. 6B to 6F. For instance, an exemplary sequence may be: D1→D1A→DP→D2A→D2→(repeat). The corresponding relationship between input and output voltage is obtained by applying the volt-sec balance principle to the voltages of the two inductors L₁ and L₂ according to equation 5.

When the load current is equal or below the threshold value, the power converter may be operated in the second mode (phase shedding mode) in which half of the magnetization current through inductor L₁ is no longer provided by the flying capacitor $C_{F2}$, but by the reservoir capacitor $C_R$ instead.

In the phase shedding mode, the second sequence of states may include the states D1' and DV' as described with reference to FIGS. 7A and 7B.

Figure 7A:
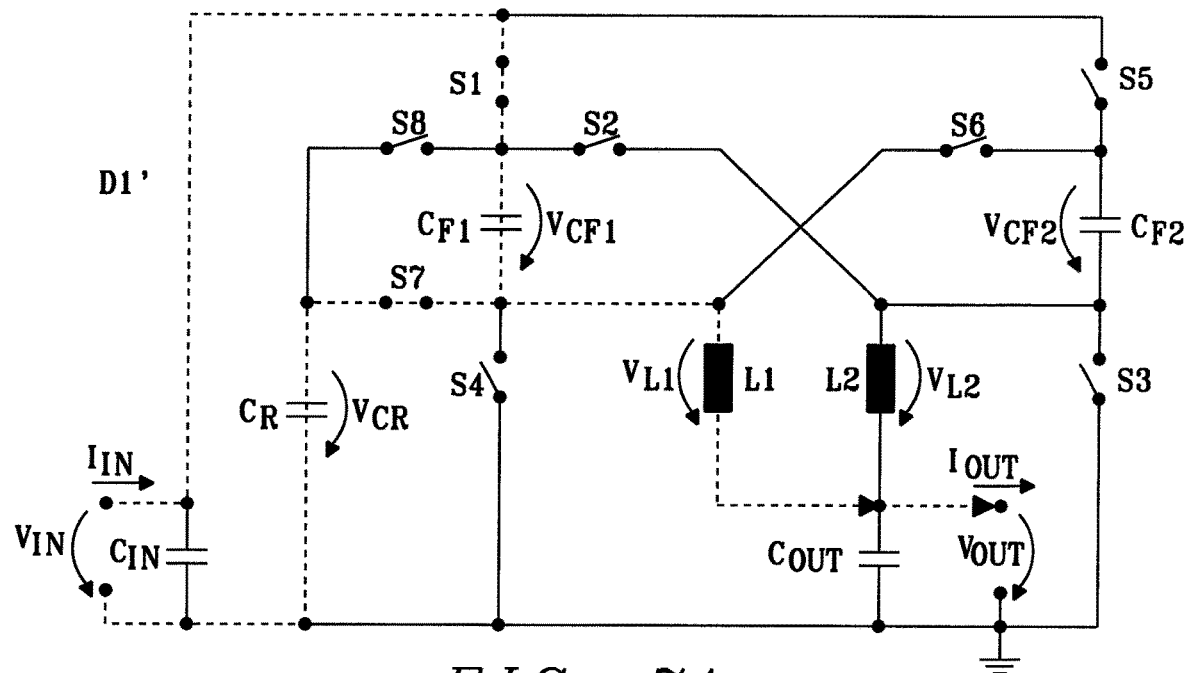
FIG. 7A is a diagram of the converter of FIG. 5 operating in a phase shedding mode state D1'.

FIG. 7A illustrates the DC-DC converter of FIG. 5 operating in the state D1'. In this state, the switches S1 and S7 are closed while the remaining switches S2-S6 and S8 are open. The ground port is coupled to the second port 504 via a path comprising $C_R$, S7 and L₁. The first port is coupled to the second port via a path comprising S1, $C_{F1}$, and L₁.

Figure 7B:
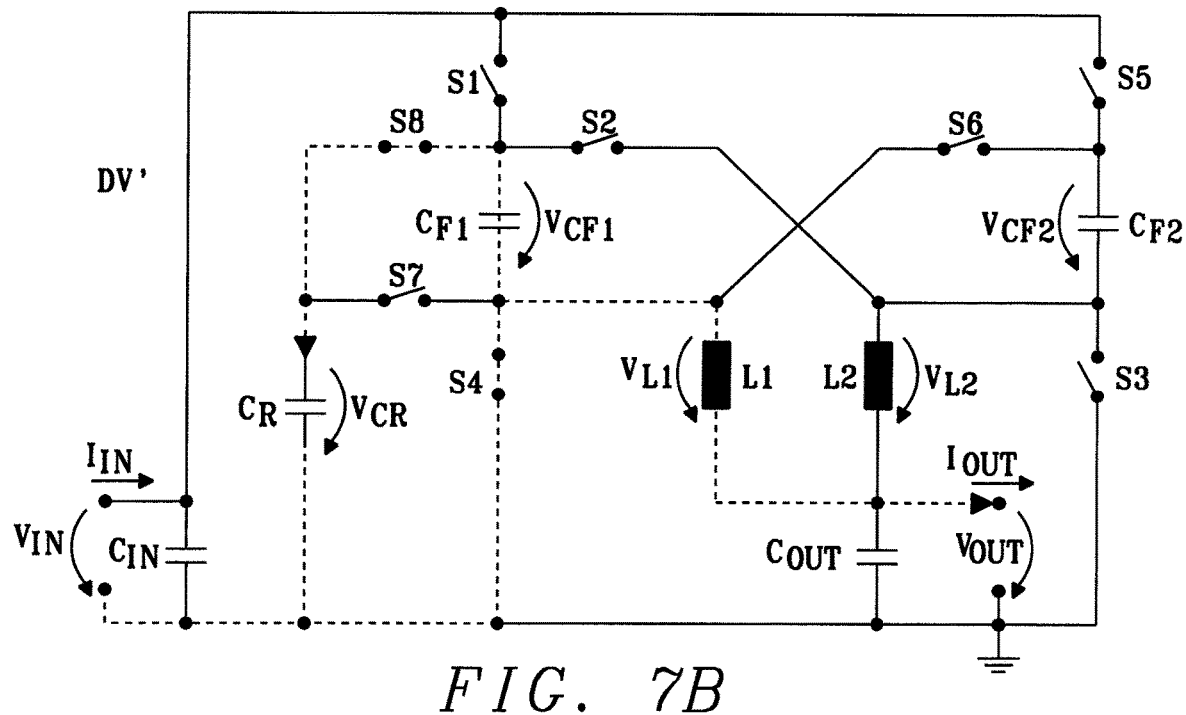
FIG. 7B is a diagram of the converter of FIG. 5 operating in a phase shedding mode demagnetization state DV'.

FIG. 7B illustrates the DC-DC converter of FIG. 5 operating in the de-magnetization state DV'. In this state, the switches S4 and S8 are closed while the remaining switches S1-S3, S5-S7 are open. The ground port is coupled to the second port 504 via a path comprising S4 and L₁. The ground is also coupled to ground via a path that includes $C_{F1}$ and $C_R$. During the inductor demagnetization state DV' charge is transferred into the reservoir capacitor $C_R$ to balance the charge of the flying capacitor $C_{F1}$. This permits the charge balancing of $C_{F1}$ and $C_R$ against the change of charge from state D1'.

In the second mode, the switching sequence is D1'→DV' are repeated iteratively (D1'→DV'→D1'→DV' . . . ). The switching sequence does not include a state involving the second inductor L₂. The corresponding relationship between input and output voltage is obtained by applying the volt-sec balance principle to the voltage of the inductor L₁:

$$\frac{V_{OUT}}{V_{IN}} = \frac{D}{2} \quad D1' = D, DV' = 1 - D \quad D \in [0, 0.5] \quad (6)$$

$$\frac{V_{OUT}}{V_{IN}} = \frac{D+1}{6} \quad D1' = \frac{1+D}{3}, DV' = \frac{2-D}{3} \quad D \in [0.5, 1] \quad (7)$$

To facilitate a smooth transition between the first mode and the second mode, the power converter may operate in a third mode, also referred to as transition mode. In the third mode the driver drives the network of switches in a third sequence of states, in which the state D1 is split in two substrates D1 and D1T; and the state D2 is split into two substrates D2 and D2T. As a result, the output current can be temporally distributed asymmetrically across the inductors.

Figure 8A:
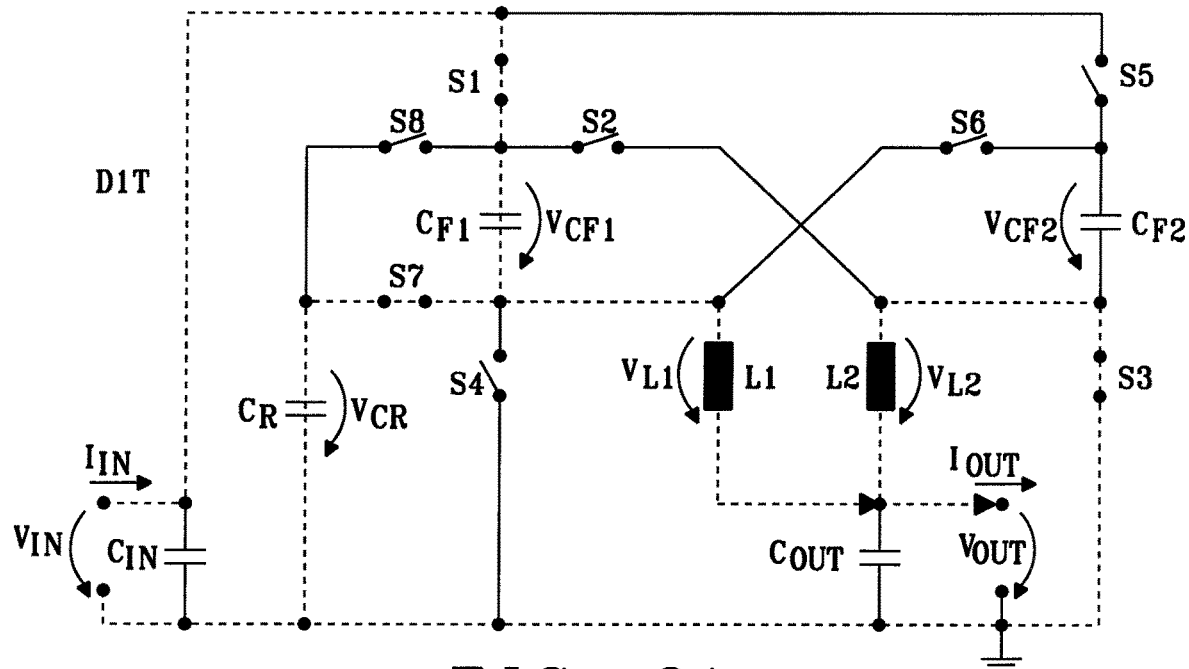
FIG. 8A is a diagram of the converter of FIG. 5 operating in a transition mode state D1T.

FIG. 8A illustrates the DC-DC converter of FIG. 5 operating in the state D1T. In this state, the switches S1, S3 and S7 are closed while the remaining switches S2, S4, S5, S6 and S8 are open. The ground port is coupled to the second port 504 via two paths: a first path comprising $C_R$, S7 and L₁, and a second path that includes S3 and L₂. The first port is coupled to the second port via a path comprising S1, $C_{F1}$, and L₁.

Figure 8B:
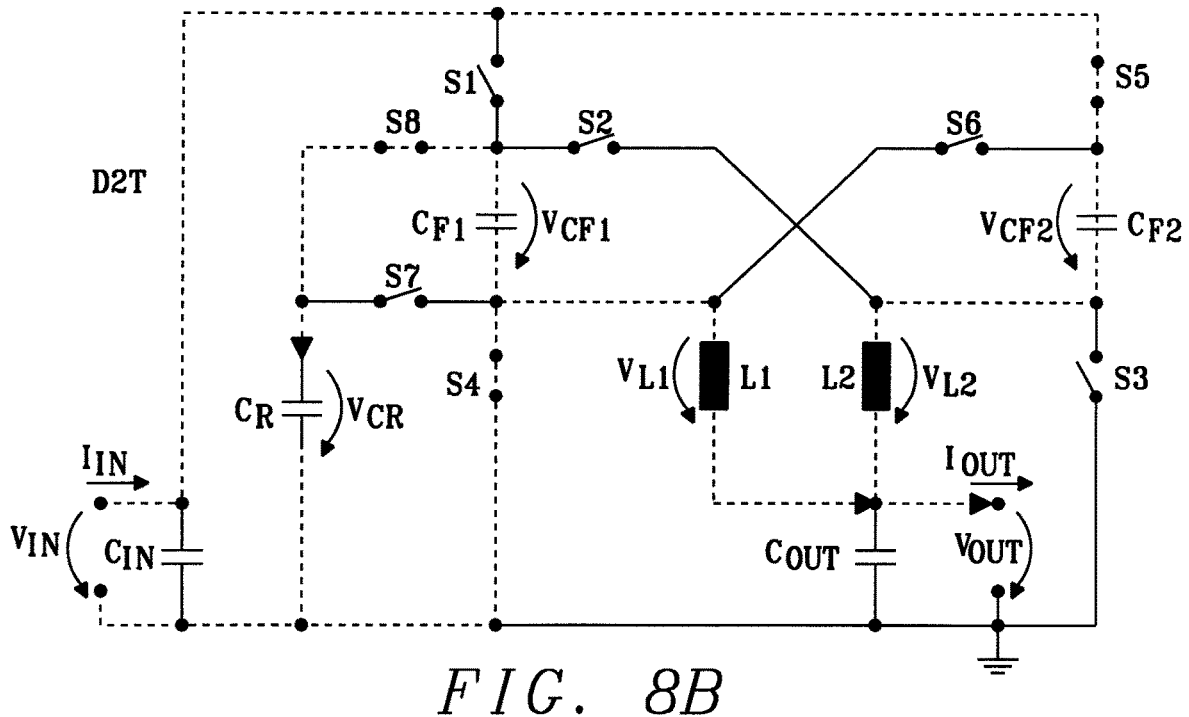
FIG. 8B is a diagram of the converter of FIG. 5 operating in another transition mode state D2T.

FIG. 8B illustrates the DC-DC converter of FIG. 5 operating in the state D2T. In this state, the switches S4, S5 and S8 are closed while the remaining switches S1, S2, S3, S6 and S7 are open. The ground port is coupled to the second port 504 via a first path comprising S4 and L₁. The ground is also coupled to ground via a path that includes S4, $C_{F1}$, S8 and $C_R$. The first port is coupled to the second port via a path comprising S5, $C_{F2}$, and L₂.

In the third mode, the switching sequence for D<0.5 may be D1→D1T→DV1→D2→D2T→DV2→(repeat). And for D>0.5 the switching sequence may be either D1→D1T→D1A→DP→D2A→D2→D2T→(repeat) or D1→D1T→DP1→D1A→D2A→DP2→D2→D2T→(repeat).

Increasing the duty cycle of switching states D1T and D2T drives the output current share of inductor L₂ from 50% down to 0%. This is because the flying capacitor $C_{F2}$ is discharged via the inductor L₂ only within the state D1, which is reduced by the duration of state D1T. At the same time the flying capacitor $C_{F2}$ must provide within the state D2T the full current through the inductor L₂ (without current from flying capacitor $C_{F1}$). This is only possible if the current through the inductor L₂ is reduced.

As soon as the average current through inductor L₂ approaches zero, the switching of inductor L₂ may be stopped without the usual undershoot of the output voltage. For an exit of phase-shedding operation without the usual output voltage overshoot, a reverse controlled transition may be implemented.

During phase shedding there is no ripple current (alternating current) through inductor L₂ (hence no magnetization/de-magnetization) and the switches S3, S5 and S6 are static open. This removes core loss from inductor L₂ as well as switching loss from switches S3, S5 and S6. Phase shedding operation adds switching loss from switches S7 and S8, but as it is typically only enabled at mid and low output currents the switches S7 and S8 may implement increased resistance and by that minimum switching loss. In result the converter efficiency at low and mid output current is improved against prior art having no capability to shed inductor phases.

The third mode could also be used to implement a steady state unbalanced inductor current. This could be useful for implementations using two inductors have different current ratings/size.

Figure 9:
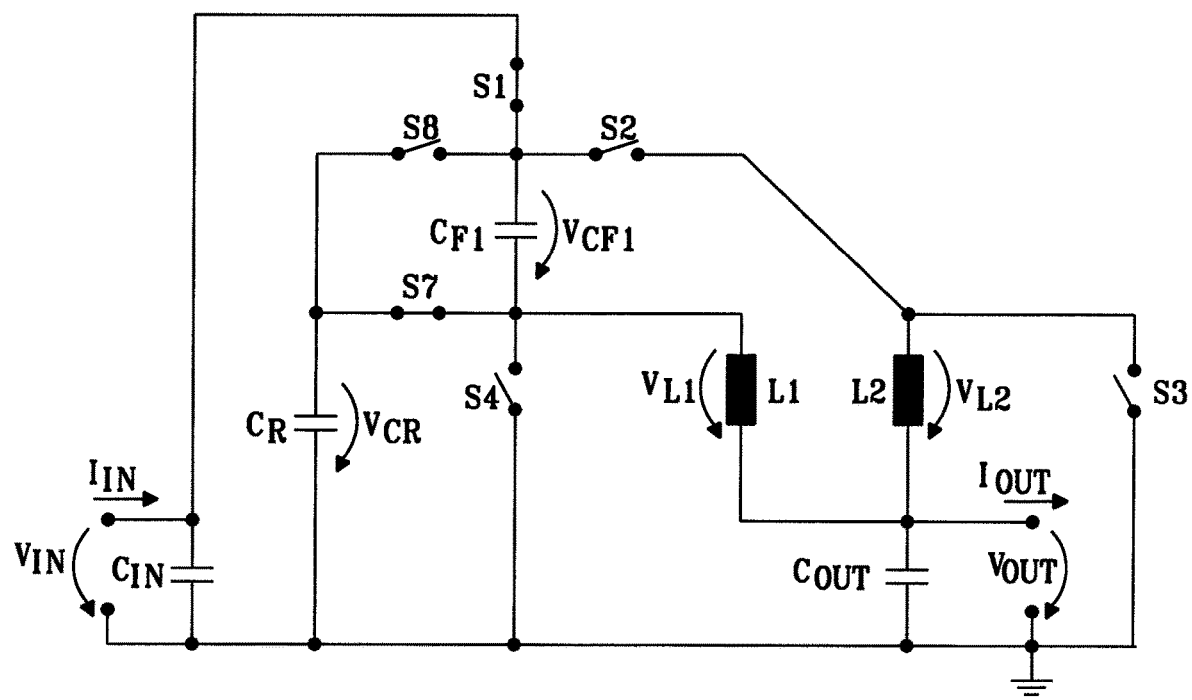
FIG. 9 is another diagram of a DC-DC converter for implementing the method of FIG. 4.

FIG. 9 illustrates another diagram of a DC-DC converter for implementing the method of FIG. 4.

In the topology of FIG. 9, is a simplified version of the topology of FIG. 5 in which the second flying capacitor $C_{F2}$ and the switches S5 and S6 have been removed.

The topology of FIG. 9 may operate in the first mode using the states DVx, D1 and D2 as described with reference to FIGS. 6A, 6C and 6D, without the current path through $C_{F2}$. The topology of FIG. 9 operates in the second mode using the states Dt and DV' described above with reference to FIGS. 7A and 7B.

This topology requires less switches but increases input current ripple with corresponding loss and does not support the increased maximum output voltage.

It will be appreciated that phase shedding may be implemented with topologies containing more than two inductors and more than two flying capacitors.

A skilled person will therefore appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A power converter for providing an output voltage with an output-to-input conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage;
   wherein the power converter comprises a reservoir capacitor, a first flying capacitor, a first inductor and a second inductor coupled to a network of switches; and a driver adapted to drive the network of switches with a sequence of states during a drive period;
   wherein the power converter is operable in a first mode to deliver an output current using both the first inductor and the second inductor and a second mode to deliver the output current using the first inductor and without using the second inductor;
   wherein when a load current is above a threshold value the driver drives the network of switches in a first sequence of states to operate the power converter in the first mode, and when the load current is equal or below the threshold value the driver drives the network of switches in a second sequence of states to operate the power converter in the second mode.

2. The power converter as claimed in claim 1, wherein the second sequence of states comprises a first state and a second state,
   wherein in the first state the first port is coupled to the second port via a path comprising the first flying capacitor and the first inductor; and wherein the ground is coupled to the second port via a path comprising the reservoir capacitor and the first inductor;
   wherein in the second state the ground in coupled to the ground via a path that includes the first flying capacitor and the reservoir capacitor; and wherein the ground is coupled to the second port via a path that includes the first inductor.

3. The power converter as claimed in claim 1, wherein the network of switches comprises
   a first switch to couple the first flying capacitor to the first port;
   a second switch to couple the reservoir capacitor to the first inductor;
   a third switch to couple the reservoir capacitor to the first flying capacitor;
   a first ground switch to couple the first inductor to ground;
   a second ground switch to couple the second inductor to ground; and
   a first inductor switch to couple the first flying capacitor to the second inductor.

4. The power converter as claimed in claim 3, comprising a second flying capacitor; wherein the network of switches comprises a fourth switch to couple the second flying capacitor to the first port; and a second inductor switch to couple the second flying capacitor to the first inductor.

5. The power converter as claimed in claim 3, wherein the power converter is operable in a third mode for transiting between the first mode and the second mode or for providing a steady state unbalanced inductor current.

6. The power converter as claimed in claim 5, wherein the driver is adapted to drive the network of switches in a third sequence of states to operate the power converter in the third mode, the third sequence of states comprising a third state, a fourth state, a fifth state and a sixth state.

7. The power converter as claimed in claim 6, wherein in the third state the first port is coupled to the second port via a path comprising the first flying capacitor and the first inductor; and wherein the ground is coupled to the second port via two paths, a first path comprising the second inductor, and a second path comprising the second flying capacitor and the first inductor; and
   wherein in the fourth state the first port is coupled to the second port via a path comprising the first flying capacitor and the first inductor; and wherein the ground is coupled to the second port via two paths, a first path comprising the reservoir capacitor and the first inductor and a second path comprising the second inductor.

8. The power converter as claimed in claim 6, wherein in the fifth state the first port is coupled to the second port via a path comprising the second flying capacitor and the second inductor; and wherein the ground is coupled to the second port via two paths, a first path comprising the first inductor, and a second path comprising the first flying capacitor and the second inductor; and
   wherein in the sixth state the first port is coupled to the second port via a path comprising the second flying capacitor and the second inductor; and wherein the ground is coupled to the ground via a path comprising the first flying capacitor and the reservoir capacitor and wherein the ground is coupled to the second port via a path comprising the first inductor.

9. The power converter as claimed in claim 6, wherein the driver is configured to gradually increase a duty cycle of the fourth state and the sixth state to reduce current through the second inductor.

10. The power converter as claimed in claim 8, wherein in the first mode the driver is adapted to drive the network of switches using a sequence of states comprising the third state, the fifth state and a seventh state.

11. The power converter as claimed in claim 10, wherein in the seventh state the ground port is coupled to the second port via a first path comprising the first inductor and a second path comprising the second inductor.

12. The power converter as claimed in claim 8, wherein the power converter is operable in a fourth mode; wherein when the output-to-input conversion ratio is greater than 0.25 for step-down conversion or smaller than 4 for step-up conversion, the driver is adapted to drive the network of switches in a fourth sequence of states to operate the power converter in the fourth mode.

13. The power converter as claimed in claim 12, wherein the fourth sequence of states comprises the third state, the fifth state, an eight state, a ninth state, and a tenth state;
   wherein in the eight state the first port is coupled to the second port via a first path comprising the first flying capacitor and the first inductor; and a second path comprising the second flying capacitor and the second inductor;
   wherein in the ninth state the ground in coupled to the second port via a first path that includes the second flying capacitor and the first inductor; and a second path that includes the second inductor;
   wherein in the tenth state the ground in coupled to the second port via a first path that includes the first flying capacitor and the second inductor; and a second path that includes the first inductor.

14. A method of converting power with an output-to-input conversion ratio, the method comprising the steps of:
providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a reservoir capacitor, a first flying capacitor, a first inductor and a second inductor coupled to a network of switches; and a driver adapted to drive the network of switches with a sequence of states during a drive period; wherein the power converter is operable in a first mode to deliver an output current using both the first inductor and the second inductor and a second mode to deliver the output current using the first inductor and without using the second inductor;
driving the network of switches in a first sequence of states to operate the power converter in the first mode when a load current is above a threshold value;
driving the network of switches in a second sequence of states to operate the power converter in the second mode when the load current is equal or below the threshold value.

* * * * *